Figure 1:
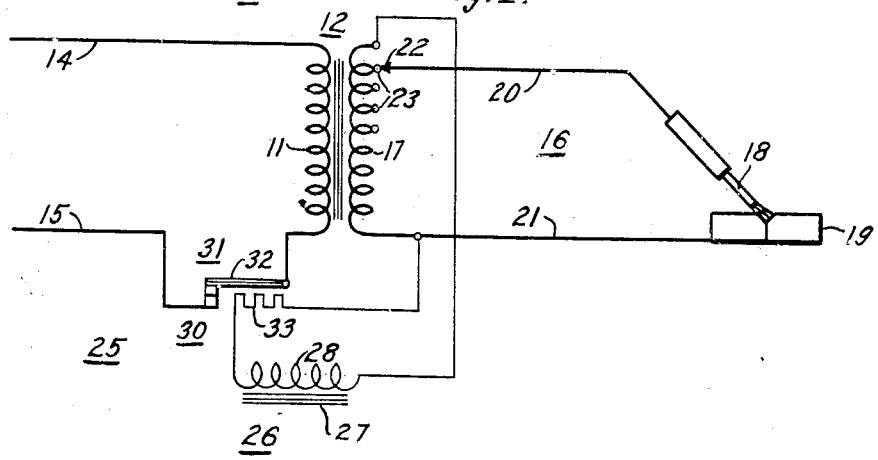

Oct. 30, 1945.  L. O. DORFMAN  2,387,889
WELDING SYSTEM
Filed July 20, 1943

WITNESSES:
Alice L. Howell
F. V. Giolma

INVENTOR
Leo O. Dorfman
BY
Geo. D. Crawford
ATTORNEY

Patented Oct. 30, 1945

2,387,889

UNITED STATES PATENT OFFICE 2,387,889

WELDING SYSTEM

Leo O. Dorfman, Forest Hills, Pa., assignor to Westinghouse Electric Corporation, East Pittsburgh, Pa., a corporation of Pennsylvania Application July 20, 1943, Serial No. 495,409

12 Claims. (Cl. 171—97)

My invention relates, generally, to welding systems and it has reference in particular to alternating current arc welding systems.

Generally stated, it is an object of my invention to provide an alternating current arc welding system which is simple and inexpensive to manufacture, and which is safe and easy to operate.

More specifically, it is an object of my invention to provide for reducing the open circuit voltage of an alternating current arc welding transformer to a safe operating value after the transformer has been connected to a source of alternating current under open circuit conditions for a predetermined period.

It is also an important object of my invention to provide for using a saturating reactor for reducing the normally relatively high open circuit voltage of an alternating current arc welding system to a safe value.

Another object of my invention is to provide for using a reactor having a relatively short time rating under open circuit conditions for reducing the open circuit voltage of an alternating current arc welding system, and provide for disconnecting the welding system from the source when the time interval of the short time open circuit rating is exceeded.

Yet another object of my invention is to provide for using a reactor, which has a relatively short time rating and which saturates at a voltage intermediate the arc voltage and the open circuit voltage of the system, for reducing the normal open circuit voltage of the system to a safe value, and prevent overloading of the reactor by deenergizing the system after it remains under open circuit conditions for a predetermined time.

Still another object of my invention is to provide for controlling the energization of an alternating current arc welding system in accordance with the time rating of a relatively short time rating reactor used to reduce the open circuit voltage of the system.

Other objects will in part be obvious, and will in part be explained hereinafter.

In practicing my invention a saturable reactor is connected across the secondary winding of the transformer in an arc welding system so as to reduce the open circuit voltage to a safe value. The reactor saturates at or slightly under the reduced open circuit voltage and has a relatively short time rating at the reduced open circuit voltage of from 15 to 30 minutes. A thermal relay controls the connection of the primary winding of the transformer and effects the disconnection thereof from the source when the open circuit voltage short time rating interval of the reactor is exceeded.

Figure 2:
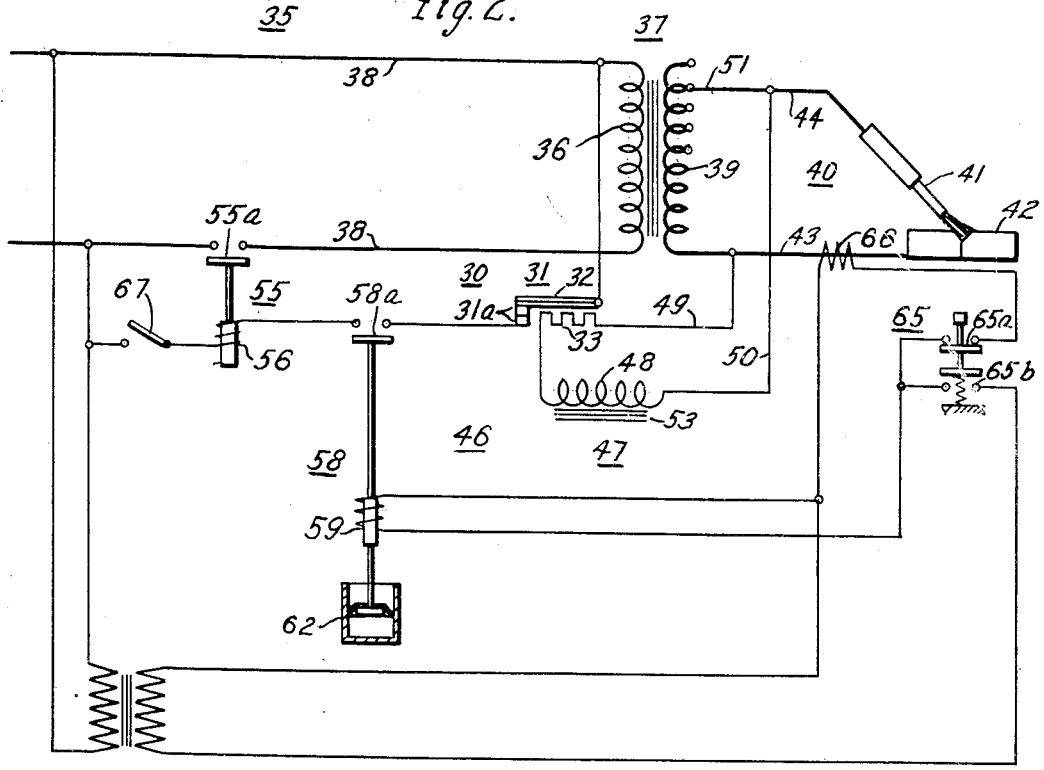

For a more complete understanding of the nature and scope of my invention reference may be made to the following description which may be studied in connection with the accompanying drawing in which:

Figure 1 is a diagrammatic view of an arc welding system embodying the invention in one of its forms; and Fig. 2 is a diagrammatic view of an arc welding system embodying the invention in another of its forms.

Referring to Fig. 1, the reference numeral 10 may denote, generally, an arc welding system wherein the primary winding 11 of an arc welding transformer 12 may be connected to a suitable alternating current source by means of conductors 14 and 15. The secondary winding 17 of the transformer may be connected to an arc welding circuit 16 including an electrode 18, work 19 upon which a welding operation is to be performed and suitable conductors 20 and 21. Adjustable connection of the welding circuit to the secondary winding 17 may be made by means of a movable tap 22 and tap connections 23 on the transformer winding.

In order to reduce the normally relatively high open circuit voltage of the secondary winding 17 to a safe value which will not harm the operator, control means denoted generally by the numeral 25, may be utilized. For example, a reactor 26 may be provided, having a magnetic core 27 with a reactor winding 28 thereon connected in shunt relation with the secondary winding 17 between the end terminals thereof so as to be connected at all times across the entire secondary winding. The reactor 26 may be designed to saturate and reduce the normal open circuit voltage of the secondary winding which may be ranged from about 60 to 80 volts, to a relatively safe value on the order of 40 to 50 volts. This reduced open circuit voltage is intermediate the normal range of arc voltage of from about 20 to 30 volts, and the usual range of open circuit voltages.

Instead of using a reactor having a continuous rating sufficient for substantially continuous operation on the reduced value of open circuit voltage, a reactor may be used in which the iron core 27 saturates at a voltage intermediate the arc voltage and the reduced open circuit value, and which has a short time rating at the reduced value of open circuit voltage on the order of from 15 to 30 minutes.

In order to protect the reactor from damage in case the welding transformer 12 should be left energized under open circuit conditions for a period greater than the short time rating, reactor control means 30 may be provided. For example, a thermal relay 31 may be provided having contact members 31a connected in series circuit relation with the primary winding 11 of the welding transformer 12 and a bimetal operating element 32.

Operation of the thermal relay 31 may be effected in accordance with the operating conditions of the reactor 26 in any suitable manner such as, for example, by means of a heater element 33 which may be connected in series circuit relation with the reactor winding 28 and disposed to heat the bimetal element 32 in accordance with the heating effects of the current in the winding 28 on the reactor. Both the heating and cooling thermal characteristics of the reactor control may be made to follow the thermal characteristics of the reactor so that the reactor will be fully protected against overheating.

When the welding transformer 12 is connected to the source, the reactor 26 is energized under full reduced open circuit voltage conditions while the welding circuit 16 remains open circuited. If the period of open circuit operation exceeds the short time rating period of the reactor, the thermal relay 31 operates to disconnect the primary winding 11 of the welding transformer from the source.

During a welding operation the voltage across the welding circuit 16 is reduced to substantially the value of the arc voltage. Under these conditions the impedance of the reactor becomes relatively high since the reactor is not saturated under such reduced voltage conditions. Accordingly, the current through the reactor winding 28 is greatly reduced during welding, so that even though the reactor is of relatively small capacity and has a relatively short time rating under the reduced open circuit voltage conditions, it will have sufficient capacity to withstand continuous welding conditions indefinitely, so that the control means 31 in no manner effects normal operation of the welding transformer.

As soon as an arc welding operation ceases, the reactor 26 is subjected to the reduced open circuit voltage at which it has only a short time rating. Should the welding circuit remain open for a period of from 15 to 30 minutes, or whatever the short time rating interval of the reactor may be, the reactor control means 30 functions to disconnect the primary winding 11 of the welding transformer from the source, thus preventing overheating of the reactor and the unnecessary energization of the welding transformer while it is not being used. By using thermal protection for the reactor which prevents reconnection of the welding transformer to the source after the thermal relay has operated, until the reactor has cooled to a safe temperature, an incentive is offered the welding operator to cause him to refrain from leaving the transformer energized and standing idle, since once the thermal relay operates he must wait for the reactor to cool before he can recommence welding.

Referring to Fig. 2, the reference numeral 35 may denote, generally, an arc welding system wherein the primary winding 36 of an arc welding transformer 37 may be connected to a suitable alternating current source by means of conductors 38. The secondary winding 39 of the transformer may be connected to a welding circuit 40 including a welding electrode 41, work 42 upon which a welding operation is to be performed, and conductors 43 and 44.

In order to reduce the open circuit voltage of the welding circuit 40 to a relatively safe value, control means 46 may be provided comprising, for example, a reactor 47 having a reactor winding 48 connected in shunt relation with the secondary winding 39 by means of conductors 49, 50 and an adjustable tap 51 for providing stepped connections to the secondary winding 39. The magnetic core 53 of the reactor 47 may, as hereinbefore, be so constructed as to saturate at a voltage intermediate the arc voltage and the reduced open circuit voltage produced by the connection of a reactor winding 48 across the secondary winding of the transformer 37.

In order to provide for controlling the energization of the primary winding 36, switch means 55 may be provided having contact members 55a connected in series circuit relation with the primary winding 36, and an operating winding 56. Energization of the operating winding 56 may be effected by means such as the time delay relay 58 having an operating winding 59. This relay may be provided with a dash-pot 62 for retarding or delaying the opening of its contact members 58a until a predetermined interval of time of from a few seconds to approximately one minute after the operating winding is deenergized. This interval is much shorter than the short time rating of the reactor and thus permits the use of a much smaller reactor without danger of overheating from the cumulative effects of successive intermittent weld periods.

The operating winding 59 of the time delay relay 58 may be initially energized from the secondary winding of a control transformer 64 by means such as the pushbutton switch 65, which may be suitably located adjacent the operator at the welding position being, for example, either separate or mounted on the electrode holder in any suitable manner. Energization of the operating winding 59 during a welding operation may be effected by means such as the current transformer 66 which may be associated with the welding circuit 40 and connected to the operating winding 59 through the normally closed contact members 65a of the pushbutton switch 65.

Since the reactor 47 has a relatively short time rating, possible overheating of the reactor may be prevented by means such as the reactor control means 30, comprising, for example, a thermal relay 31 which may have contact members 31a connected in series circuit relation with the operating winding 56 of the switch 55, and a bimetal operating element 32 disposed to be heated by means of a heater 33 connected in series circuit relation with the reactor winding 48. A control switch 67 may be provided for disconnecting the control system from the source.

When the control switch 67 is closed the welding circuit 40 may be energized by operating the pushbutton switch 65 to close the normally open contact members 65b. An energizing circuit is thereby completed between the secondary winding of the control transformer 64 and the operating winding 59 of the time delay relay 58. The time delay relay operates, closing its contact members 58a and thereby connecting the operating winding 56 of the switch 55 across the source between the two conductors 38. Closure of the contact members 55a of the switch 55 connects the primary winding 36 of the welding transformer to the source and energizes the welding circuit 40.

As soon as the pushbutton switch 65 is released, it returns to the normal position and disconnects the operating winding 59 of the time delay relay from the control transformer 64. Should the welding circuit 40 remain open circuited for a sufficient time, the time delay relay 58 will return to the deenergized position at the end of several seconds or so, deenergizing the operating winding 56 of the switch 55 so that the switch 55 opens and disconnects the primary winding of the transformer 37 from the source. However, should a welding operation be commenced within the predetermined interval of time during which the time delay relay remains in the energized position, the operating winding 59 of the time delay relay will be energized from the current transformer 66 in the welding circuit and the relay will remain in the energized position until a predetermined interval of time after the completion of a welding operation.

During a welding operation the reactor 47 remains connected in shunt circuit relation with the active portion of the secondary winding 39. However, since the arc voltage is of a lower value than the saturating voltage of the magnetic core 53, the impedance of the reactor winding 48 is relatively high, and the reactor 47 causes little or no change in the welding circuit conditions during welding.

Upon the termination of a welding operation the current transformer 66 no longer energizes the operating winding 59 of the time delay relay 58. Accordingly, after a predetermined interval of time the time delay relay 58 returns to the deenergized position opening its contact members 58a and interrupting the energizing circuit for the operating winding 56 of the switch 55. The switch 55 thereupon returns to the deenergized position opening contact members 55a and disconnecting the primary winding 36 of the welding transformer from the source.

If overheating of the reactor 47 should be caused by an unusually large number of very frequent open circuit conditions, a fault, or some other abnormal condition, additional protection may be provided by means of the thermal relay 31, having contact members 31a connected in the energizing circuit of the operating winding 56 of the switch 55 for deenergizing the operating winding thereof when the temperature of the reactor 47 reaches a predetermined maximum safe value.

From the above description and the accompanying drawing, it will be apparent that I have provided in a simple and effective manner for reducing the normally relatively high open circuit voltage of alternating current arc welding systems to a relatively safe value. A system embodying the principal features of my invention is both simple and inexpensive to manufacture and entirely safe and reliable in operation. By using a reactor which saturates at a voltage intermediate the arc voltage and the reduced open circuit value, it may be made most effective under open circuit conditions when its effect is most needed, and least effective under welding conditions when its effects are least needed. Since the reactor is unsaturated during welding, the current through the reactor winding is at a minimum and only a relatively small size reactor is necessary.

Since it is not desirable to leave a welding transformer idly connected to the source for extended periods, it is, therefore, most desirable to use a relatively small and inexpensive reactor for reducing the open circuit voltage, and provide control means responsive to temperature conditions of the reactor in accordance with the teachings of my invention. Not only is the reactor thereby protected against overheating but disconnection of the welding transformer from the source is also effected when it is not being used, thereby both protecting the reactor and reducing the losses which would otherwise be incurred through having an idle welding transformer connected to the source for relatively long periods of time.

By using a thermal relay having a short time rating on the order of from 15 to 30 minutes, and cooling characteristics similar to those of the reactor, so that the welding transformer cannot be reenergized for an appreciable time after the relay operates in order to permit the reactor to cool sufficiently, an inducement is offered the operator to refrain from leaving the transformer idle when it is energized.

Since certain changes may be made in the invention as above described, and different embodiments of the invention may be made without departing from the spirit or scope thereof, it is intended that all the matter contained in the above description or shown in the accompanying drawing shall be considered as illustrative, and not in a limiting sense.

I claim as my invention:

1. An arc welding system comprising, an arc welding transformer having a primary winding for connection to a source of alternating current, and a secondary winding with a predetermined open circuit voltage for connection to an arc welding circuit, means for reducing the open circuit voltage of the transformer to a safe value comprising a reactor having a relatively short time rating at the reduced safe value of voltage connected across the secondary winding, and control means operable to disconnect the primary winding from the source when the reactor is subjected to the reduced safe value of open circuit voltage for a period equal to the short time rating interval.

2. An arc welding system comprising, an arc welding transformer having a primary winding for connection to a source of alternating current and a secondary winding having a predetermined open circuit voltage, means reducing the open circuit voltage to a predetermined relatively low value comprising a reactor having a winding connected across the secondary winding and a magnetic core saturable at a voltage slightly below the reduced open circuit value, said reactor having a substantially continuous rating at the value of arc welding voltage and a short time rating of less than one half hour on the reduced open circuit voltage, and control means effective to disconnect the primary winding from the source when the reactor has been maintained at the reduced open circuit voltage for the period of the short time rating.

3. An arc welding system comprising, a transformer having a primary winding for connection to a source of alternating current and a secondary winding for connection to an arc welding circuit, a reactor having a winding connected in shunt circuit relation with the secondary winding for reducing the open circuit voltage of the arc welding circuit and a magnetic core saturable at a voltage between the reduced open circuit value and the normal arc voltage, and means including a thermal relay responsive to the temperature of the reactor for disconnecting the primary winding from the source.

4. An arc welding system comprising, an arc welding transformer having primary and secondary windings, circuit means for adjustably connecting a welding circuit across different amounts of the secondary winding, reactor means shunting the entire secondary winding, and control means including contact means connected in series relation with the primary winding and means responsive to operation of the reactor means under open circuit conditions for a predetermined time interval for effecting an operation of the contact means.

5. An arc welding system comprising, an arc welding transformer having primary and secondary windings, a reactor having a winding connected in shunt relation with the secondary winding and disposed to saturate when the secondary voltage exceeds a predetermined value, switch means connected in series circuit relation with the primary winding, and means effecting operation of the switch means in response to predetermined temperature conditions of the reactor to deenergize the primary winding after the reactor has been saturated for a time no greater than the short time rating interval of the reactor.

6. The combination with an arc welding transformer having a primary winding for connection to an alternating current source and a secondary winding for connection to an arc welding circuit, of reactor means connected in shunt relation with the secondary winding for reducing the normal open circuit voltage to a value intermediate said normal open circuit value and the normal arc voltage, switch means for connecting the primary winding to the source, and means responsive to the reactor temperature for operating the switch means to disconnect the primary winding from the source.

7. An arc welding system comprising, an arc welding transformer having a primary winding for connection to an alternating current source and a secondary winding having an open circuit voltage of about 70 to 85 volts, a reactor connected in shunt relation with the secondary winding to reduce the open circuit secondary voltage to about 40 to 50 volts, said reactor saturating at about 30 to 40 volts and having a short time rating of from 15 to 30 minutes at the reduced secondary voltage, and control means including a thermal device responsive to predetermined temperature conditions of the reactor for disconnecting the primary winding from the source.

8. Safety control means for an arc welding transformer comprising, a reactor connected across the secondary winding to reduce the open circuit voltage, said reactor being saturable under open circuit voltage conditions, and control means including a switch device and means responsive to a temperature condition of the reactor for disconnecting the primary winding from the source after the reactor has been saturated for a predetermined interval of time.

9. Safety control means for an alternating current arc welding system utilizing an arc welding transformer comprising, reactor means connected across the secondary winding of the welding transformer for reducing the open circuit voltage to a safe value, said reactor means being of reduced capacity and having a short time rating of from 15 to 30 minutes at the reduced open circuit voltage, and control means including switch means controlling the energization of the primary winding from the source and means responsive to the temperature of the reactor means for disconnecting the transformer from the source.

10. An arc welding system comprising, an arc welding transformer having a primary winding for connection to an alternating current source and a secondary winding for connection to an arc welding circuit, a reactor having a winding connected in shunt relation with the secondary winding to reduce the open circuit voltage to a value intermediate the normal open circuit value and the arc voltage and a magnetic core saturable at a voltage intermediate the reduced open circuit value and the arc voltage, said reactor being of sufficient capacity to operate at the reduced open circuit voltage for a predetermined time of from 15 to 30 minutes, and control means including switch means in series with the primary winding and means responsive to thermal conditions of the reactor for disconnecting the primary winding from the source whenever the transformer is connected to the source under open circuit conditions for the predetermined time.

11. Safety control means for an arc welding system having an arc welding transformer with a primary winding for connection to an alternating current source and a secondary winding for connection to an arc welding circuit comprising, a reactor connected in shunt relation with the secondary winding to reduce the open circuit voltage, said reactor being saturable at a voltage intermediate the arc voltage and the reduced open circuit voltage, switch means connected in series circuit relation with the primary winding, and control means including a thermal device responsive to temperature conditions of the reactor for effecting operation of the switch means to disconnect the primary winding from the source.

12. A safety control system for an arc welding transformer having primary and secondary windings comprising, a relatively short time rating reactor connected in shunt relation with the secondary winding to reduce the normal open circuit voltage, said reactor being saturable at a voltage intermediate the arc voltage and the reduced open circuit value, switch means operable to connect the primary winding to a source of alternating current, relay means operable to effect an operation of the switch means, said relay means being disposed to remain in the operative position for a predetermined time after it is deenergized, control means including a push-button station and current responsive means operable to effect energization of the relay means during a welding period, and means responsive to the temperature of the reactor operable to render the switch means inoperative.

LEO O. DORFMAN.